(12) United States Patent
Bell et al.

(10) Patent No.: US 9,222,799 B1
(45) Date of Patent: Dec. 29, 2015

(54) NAVIGATION DATA VALIDATION SYSTEMS AND METHODS

(75) Inventors: Douglas A. Bell, Marion, IA (US); James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 8 days.

(21) Appl. No.: 13/566,302

(22) Filed: Aug. 3, 2012

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| G06F 7/70 | (2006.01) |
| G06F 19/00 | (2011.01) |
| G06G 7/00 | (2006.01) |
| G06G 7/76 | (2006.01) |
| G01C 21/16 | (2006.01) |

(52) U.S. Cl.
CPC .............. G01C 23/00 (2013.01); G01C 21/16 (2013.01); G01C 21/165 (2013.01)

(58) Field of Classification Search
USPC .......................................................... 701/4
See application file for complete search history.

(56) References Cited

U.S. PATENT DOCUMENTS

| | | | | |
|---|---|---|---|---|
| 5,877,723 | A * | 3/1999 | Fan | 342/357.31 |
| 6,167,347 | A * | 12/2000 | Lin | 701/472 |
| 6,640,165 | B1* | 10/2003 | Hayward et al. | 701/4 |
| 2002/0188386 | A1* | 12/2002 | Day | 701/4 |
| 2004/0267444 | A1* | 12/2004 | Coatantiec et al. | 701/202 |
| 2009/0189787 | A1* | 7/2009 | Khatwa | 340/970 |

OTHER PUBLICATIONS

U.S. Appl. No. 12/892,546, filed Sep. 28, 2010, Bell et al.
U.S. Appl. No. 13/193,788, filed Jul. 29, 2011, McCusker.

* cited by examiner

*Primary Examiner* — Yonel Beaulieu
*Assistant Examiner* — Lail Kleinman
(74) *Attorney, Agent, or Firm* — Angel N. Gerdzhikov; Donna P. Suchy; Daniel M. Barbieri

(57) ABSTRACT

Present novel and non-trivial systems and methods for validating navigation data are disclosed. A processor receives navigation data from an external source such as a global positioning system ("GPS"); receives navigation data from a second source comprised of multiple sources; determines the validity of the GPS navigation data; and alerts the pilot if validity of the data falls outside a limit. In an embodiment related to lateral information (i.e., geographic position) data, the second navigation data is comprised of both GPS data and data provided from an internal source. In an embodiment related to altitude information data, the second navigation data is comprised of both GPS data and data provided by multiple internal sources.

16 Claims, 4 Drawing Sheets

NAVIGATION DATA VALIDATION SYSTEMS AND METHODS

BACKGROUND OF THE INVENTION

1. Field of the Invention

This invention pertains generally to the field of navigation systems such as, but not limited to, aircraft navigation systems.

2. Description of the Related Art

The continuing growth of aviation has placed increasing demands on airspace capacity and emphasizes the need for the best use of the available airspace. These factors, along with the accuracy of modern aviation navigation systems and the requirement for increased operational efficiency in terms of direct routings and track-keeping accuracy, have resulted in the concept of "Required Navigation Performance" ("RNP") standards—statements of the navigation performance accuracy necessary for operation within a defined airspace. Some of these standards appear in an Advisory Circular ("AC") published by the Federal Aviation Administration ("FAA") and in a Document ("DO") published by the Radio Technical Commission for Aeronautics ("RTCA"). For example, the FAA has published AC 120-29A entitled "Criteria for Approval of Category I and Category II Weather Minima for Approach," and the RCTA has published DO-236B entitled "Minimum Aviation System Performance Standards: Required Navigation Performance for Area Navigation."

RNP may include performance and functional requirements indicated by the RNP type. The RNP type defines the total system error ("TSE") that may be allowed in lateral and longitudinal dimensions within a particular airspace, where the TSE takes into account path definition errors ("PDE"), navigation system errors ("NSE"), and flight technical errors ("FTE"). The RNP type is used to specify navigation requirements for the airspace or a navigation system that provides a specified level of accuracy defined by a lateral area of confined airspace in which an RNP-certified aircraft operates. For example, an RNP 0.3 level requires a normal navigational accuracy of 0.3 nautical miles ("NM") at least 95 percent of the total flight time; similarly, an RNP 0.1 level requires a normal navigational accuracy of 0.1 NM at least 95 percent of the total flight time. Hence, a lower level of RNP means a greater level of navigational accuracy. With the availability of satellite navigation systems such as the Global Positioning System ("GPS"), future airspace systems may rely heavily on GPS-based navigation to which stringent standards for NSE may be applied. An instrument approach procedure ("IAP") specifying an RNP level of less than RNP 0.3 or lower than the standard minima at airports not equipped with Instrument Landing Systems ("ILS") airports may require a method to detect GPS position errors before the 6.2 second time-to-alert standard that currently exists. A similar requirement may be made for manufacturers and/or end-users wishing to take advantage of the standards published in RTCA DO-315B entitled "Minimum Aviation System Performance Standards (MASPS) for Enhanced Vision Systems, Synthetic Vision Systems, Combined Vision Systems and Enhanced Flight Vision Systems."

One way to achieve a greater level of navigational accuracy is to reduce the TSE. Because the TSE may be comprised of the PDE, NSE, and FTE, a reduction of any of these—such as the NSE—could reduce the TSE which, in turn, could produce a greater level of navigational accuracy. A reduction of NSE could be obtained by monitoring and/or augmenting navigation data provided by one or more navigation systems with an independent source of navigation data. Such independent source could be used to validate the navigation system navigation data by confirming the navigation system navigation data falls within lower desired tolerances commensurate with a lower NSE. Moreover, the confirmation of valid navigation may permit a reduction of a minimum decision altitude ("MDA") and/or decision height ("DH") of an IAP performed during an approach-for-landing phase of flight, where one such procedure may be a Localizer Performance with Vertical Guidance ("LPV") IAP or any IAP with vertical guidance requiring higher integrity.

The independent source could also be used to generate altitude data and/or height data. The use of an independent source to generate altitude data and/or height data is disclosed in U.S. Pat. No. 8,321,074 entitled "Altitude Data Generation System, Device, and Method," which is hereby incorporated by reference in its entirety.

BRIEF SUMMARY OF THE INVENTION

The embodiments disclosed herein present novel and non-trivial systems and methods for validating navigation data by monitoring lateral position (i.e., geographic position) information and altitude information for use onboard an aircraft during an approach-for-landing phase of flight. With the embodiments disclosed herein, data from SBAS-aided satellite navigation system and an inertial system may be employed to monitor the satellite navigation system lateral position solution for short-term and long-term faults (or position biases smaller than a GPS alert limit but larger than an alert limit required for the specific flight phase) and produce an alert to the pilot and/or autopilot. In addition, data from SBAS-aided satellite navigation system, an inertial system, an air-data computer system, a radar system, and a source of terrain data may be employed to monitor the satellite navigation system altitude solution for short-term and long-term faults and produce an alert to the pilot and/or autopilot.

In one embodiment, a system for validating geographic position information represented in navigation data is disclosed. The system may be comprised of a source of first navigation data, a source of second navigation data, a source of third navigation data, a processor, and a presentation system for informing the pilot of the validity of the first navigation data. The second navigation data may be a combination of the first navigation data and the third navigation data.

In one embodiment, a method for validating geographic position information represented in navigation data is disclosed, where the method could be performed by the system processor. When properly configured, the processor may receive the first navigation data, receive the second navigation data, determine a validity of the first navigation data by comparing it with the second data, and generated validity advisory data responsive to the validity determination. As embodied herein, the second navigation data may be an integration of the first navigation data and third navigation data.

In another embodiment, a system for validating altitude information represented in navigation data is disclosed. The system may be comprised of a source of first navigation data, a source of second navigation data, a plurality of sources of internal navigation data, a source of object data, a processor, and a presentation system for informing the pilot of the validity of the first navigation data. The second navigation data may be an integration of the first navigation data with internally-sourced navigation data comprised of third navigation data, fourth navigation data, fifth navigation data, and the object data.

In another embodiment, a method is disclosed for validating altitude information represented in navigation data, where the method could be performed by the system processor. When properly configured, the processor may receive the first navigation data, receive the second navigation data, determine a validity of the first navigation data by comparing it with the second data, and generated validity advisory data responsive to the validity determination. As embodied herein, the second navigation data may be an integration of the first navigation data with the third navigation data, the fourth navigation data, the fifth navigation data, and the object data.

BRIEF DESCRIPTION OF THE DRAWINGS

The drawings of FIG. 1 depict a functional block diagram of a system for validating navigation data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
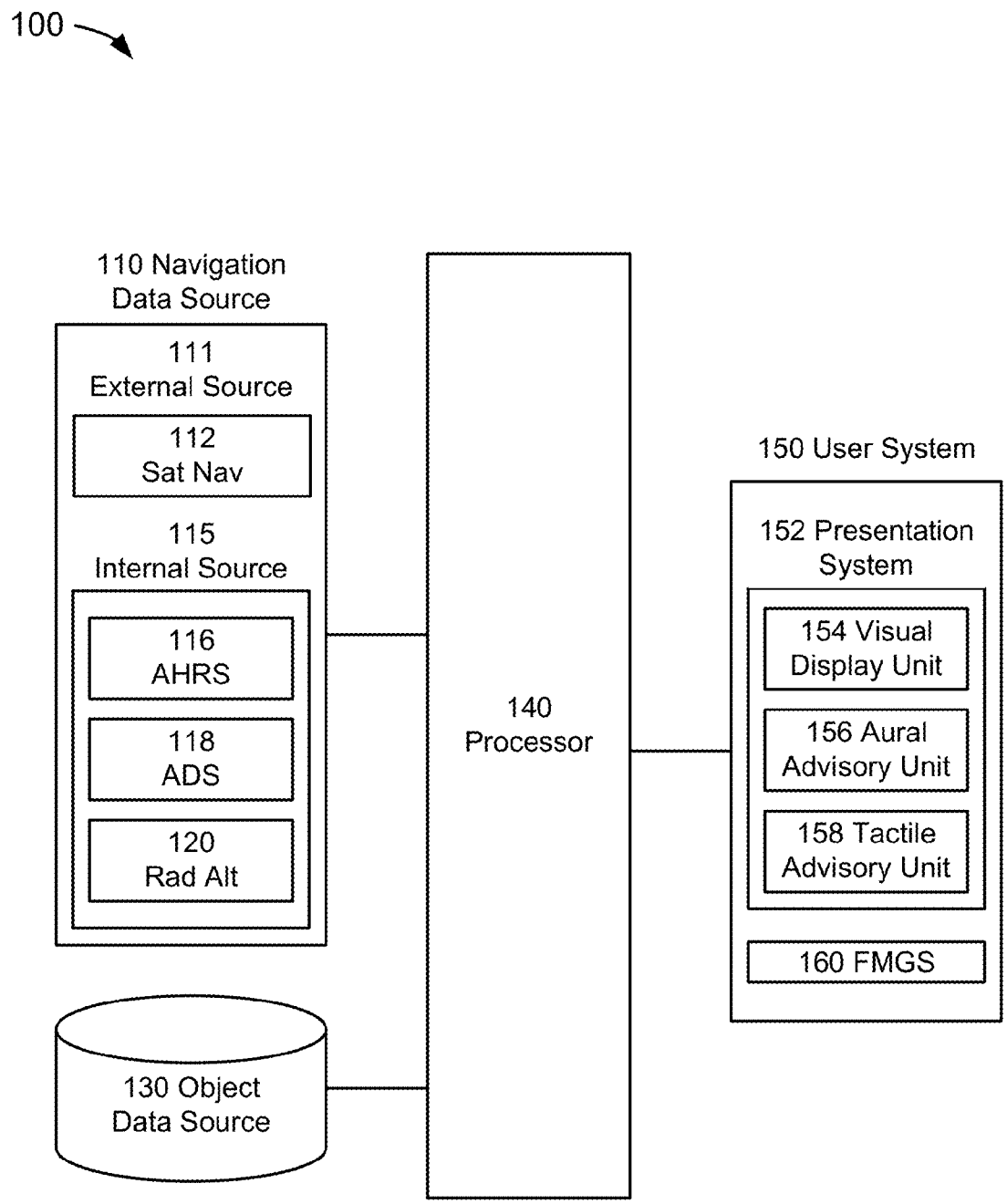

FIG. 1 depicts a functional block diagram of a navigation data validation system 100 suitable for implementation of the techniques described herein. The functional blocks of the system may include a navigation data source 110, an object data source 130, a processor 140, and a user system 150.

In an embodiment of FIG. 1, the navigation data source 110 may be comprised of one or more systems for acquiring and providing navigation data to any aircraft system requiring an input of navigation data. As embodied herein, data could be comprised of any analog or digital signal, either discrete or continuous, which could contain information. As embodied herein, signals are synonymous with data. In addition, aircraft could mean any manned or unmanned vehicle which is able to fly through the air, atmosphere, and/or space including, but not limited to, lighter than air vehicles and heavier than air vehicles, wherein the latter may include fixed-wing and rotary-wing vehicles. Additionally, aircraft could be watercraft capable of operating on or beneath water.

The navigation data source 110 could be comprised of, but not limited to, an external source 111 and/or an internal source 115. The external source 111 may refer to a data source which acquires raw data from a source external to the aircraft, and the internal source 115 may refer to a data source which acquires raw data from a source internal to the aircraft. For both types of sources, the raw data could be data from which navigation data may be determined.

An example of an externally-sourced navigation data source 111 is a satellite navigation system ("Sat Nav") 112. From the external source 111, navigation data such as aircraft position data comprised of geographic position (e.g., latitude and longitude coordinates) data and altitude data may be determined and provided as output. In addition, data representative of the quality of the navigation data may be provided by the navigation data source 110, where such data may include parameters associated with, but not limited to, accuracy, resolution, integrity, uncertainty, and/or validity. Those skilled in the art understand that quality of navigation data could depend on the system providing the data, e.g., an air/data system, an attitude heading reference system, an inertial guidance system (or inertial reference system), a global navigation satellite system (or satellite navigation system), and a flight management computing system. Furthermore, the quality of navigation data provided by a system could depend on other considerations.

The quality of navigation data provided by the Sat Nav 112 could depend on other considerations such as whether an augmentation system is employed to augment satellite signals. A Satellite-Based Augmentation System ("SBAS") such as the wide area augmentation system ("WAAS") employed by the United States Federal Aviation Administration ("FAA") may deliver an increase of quality of data through such parameters as accuracy, availability, and integrity; a WAAS broadcast message may improve signal accuracy from 100 meters to approximately 7 meters. A Ground-Based Augmentation System ("GBAS") such as the local area augmentation system ("LAAS") employed by the FAA may deliver better quality of data than a WAAS by providing extremely high parameters of accuracy, availability, and integrity; for example, a LAAS has demonstrated an accuracy of less than 1 meter in both the horizontal and vertical axes.

Examples of an internally-sourced navigation data source 115 could include, but not be limited to, an attitude heading reference system ("AHRS") 116, an air/data system ("ADS") 118, and a radar altimeter system ("Rad Alt") 120 (the term "radar altimeter" is also known as "radio altimeter" to those skilled in the art). The AHRS 116 could be representative of any system in which navigation data is derived from inertial sensors such as accelerometers for measuring motion on the axes of an aircraft and/or gyroscopes for measuring rotation about the axes. Known to those skilled in the art and depending on the specific configuration, the AHRS 116 is an inertial system that could provide output data representative of heading, pitch, roll, body rate and accelerations, and/or vertical acceleration from which vertical velocity data may be derived, where vertical velocity data may be considered vertical travel data representative of a vertical distance traveled over a period of time. As disclosed herein, data which may be used to measure vertical movements may be considered vertical travel data.

The ADS 118 could be representative of any system in which navigation data is derived from an aircraft's pilot-static system and the sensors thereof. Known to those skilled in the art, the ADS 118 could provide output data representative of barometric altitude, corrected barometric altitude, altitude trend, computed airspeed, true airspeed, mach number, static air temperature, and/or total air temperature.

The Rad Alt 120 could be representative of any system in which navigation data is derived by measuring the height above the terrain directly beneath an aircraft. Known to those skilled in the art, the Rad Alt 120 could provide output data representative of an aircraft radar altitude, i.e., height above terrain. As embodied herein, the navigation data source 110 could provide navigation data to the processor 140 for subsequent processing as discussed in detail below.

As discussed above, the quality of navigation data provided by the navigation data source 110 may depend upon one or more quality parameters such as, but not limited to, accuracy, resolution, integrity, uncertainty, and/or validity. Due to the quality of navigation data, there could be a difference between the aircraft position information represented in the navigation data and the actual position of the aircraft. For example, the altitude information provided by the Sat Nav 112 may not agree with the actual altitude of the aircraft.

In such instances, an aircraft radar system may be used to generate altitude data which in turn, may be used to verify other source(s) of altitude data; this was disclosed by Bell et al in U.S. Pat. No. 8,410,975 entitled "Systems and Methods for Generating and Verifying Altitude Data," which is incorporated by reference in its entirety. In other instances, the aircraft radar system may be used to generate height above a reference point data which in turn, may be used to validate other source(s) of altitude data; this was disclosed by McCusker in U.S. Pat. No. 8,659,471 entitled "Systems and Methods for Generating Aircraft Altitude Height and Employing Such Height Data to Validate Altitude Data," which is incorporated by reference in its entirety.

Besides the quality of navigation data provided by one source, the quality of navigation data could differ between navigation data sources 110. For example, the barometric altitude information provided by the ADS 118 may not agree with altitude information provided by the Sat Nav 112; moreover, each of these may not agree with the actual altitude of the aircraft. In order to validate the altitude information provided by the externally-sourced navigation data source 111, the internally-sourced navigation data sources 115 may be integrated with each other and with the externally-sourced navigation data source 111 and used to validate navigation data as discussed in detail below.

In an embodiment of FIG. 1, the object data source 130 could be comprised one or more sources of object data that could be comprised of terrain data and/or surface feature data. The object data source 130 could be comprised of, but is not limited to, a terrain database configured to store terrain data contained in digital elevation models ("DEM"). Generally, the terrain data of a DEM are stored as grids, and each grid represents an area of terrain and is commonly referred to as a terrain cell. The object data source 130 could be a database configured to store data representative of surface features such as, but not limited to, obstacles, buildings, lakes and rivers, and paved or unpaved surfaces. The object data source 130 is a data source known to those skilled in the art.

It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Any database used in the embodiments disclosed herein may be a stand-alone database or a combination of databases.

In an embodiment of FIG. 1, the processor 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The processor 140 may be driven by the execution of software or computer instruction code containing algorithms developed for the specific functions embodied herein. The processor 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the processor 140 could be a processor(s) used by or in conjunction with any other system of the aircraft including, but not limited to, the navigation data source 110, the aircraft radar system 120, the object data source 130, the user system 150, an FMS, or any combination thereof.

The processor 140 may be programmed or configured to receive as input data representative of information obtained from various systems and/or sources including, but not limited to, the navigation data source 110 and the object data source 130. As embodied herein, the terms "programmed" and "configured" are synonymous. The processor 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The processor 140 may be programmed or configured to execute one or both of the methods discussed in detail below. The processor 140 may be programmed or configured to provide output data to various systems and/or units including, but not limited to, the user system 150.

In an embodiment of FIG. 1, the user system 150 could be comprised of any system that may use or receive validating data (or validity advisory data) representative of the validity information of navigation data, where such navigation data could be representative of measurement(s) of aircraft geographic position and/or aircraft altitude. Examples of the user system 150 include, but are not limited to, a presentation system 152 and a flight management and guidance system ("FMGS") 160. The user system 150 could also include the navigation data source 110.

The presentation system 152 could be comprised of a visual display unit 154, an aural advisory unit 156, and/or a tactile advisory unit 158 for presenting the pilot with navigation data validity information. As embodied herein, the visual display unit 154 may include a vision system (not shown) which generates an image data set which represents the image displayed on a display unit. Vision systems could include, but are not limited to, a synthetic vision system ("SVS"), an enhanced vision system ("EVS"), and/or a combined SVS-EVS.

The visual display unit 154 could be comprised of any unit which may present the pilot with visual information or indications regarding the validity of navigation data. The visual display unit 154 could be comprised of, but not limited to, a Primary Flight Director, Navigation Display, Head-Down Display, Head-Up Display, Multipurpose Control Display Unit, Engine Indicating and Crew Alerting System, Electronic Centralized Aircraft Monitor, Multi-Function Display, Side Displays, and Data Link Control Display Unit. As embodied herein, the disclosures may apply to a portable device including, but not limited to, tablets which employ a display unit and/or aural alert unit.

The validity information regarding navigation data information may be presented by displaying or projecting such validity information on the screen of the visual display unit 154. Validity information may include advisories comprised of alerts and/or non-alert(s). Alerts may be based on level of threat or conditions requiring immediate crew awareness. Caution alerts may be alerts requiring immediate crew awareness and subsequent flight crew response. Warning alerts may be alerts requiring immediate flight crew action. As embodied herein, both caution and warning alerts may be presented in combination with or simultaneous to aural alerts and/or tactile alerts. Alerts may be presented visually by depicting one or more colors that may be presented on a display unit indicating one or more levels of threat. For the purpose of illustration and not limitation, amber or yellow may indicate a caution alert, and red may indicate a warning alert; green, white, or cyan may indicate information that is not an alert.

It should be noted that the disclosure herein will discuss visual advisories which present a textual form with a plurality of words included. As used herein, the words should be construed as generic words for advisory information provided to the pilot and not words which limit the presentation to the recipient. For the purpose of illustration and not limitation, a non-exhaustive list of words that may be used (where such words may depend on the conditions experienced by an aircraft either on the ground or in flight) could include, but are not limited to, "VALIDITY CHK FAIL" or "NAV DATA NOT VALID" when a determination of validity is not favorable, "VALIDITY CHK PASS" or "NAV DATA VALID" when a determination of validity is favorable, or "VALIDITY CHK—TBD" or "NAV DATA—TBD" when waiting for the result of a validity determination. In addition, if the navigation data is not valid for one required navigation performance ("RNP") standard but is not valid for a more restrictive RNP standard, then the visual advisory may be any visual information which visually conveys this degradation and/or unavailability of information of a specific performance standard to the pilot.

The aural advisory unit 156 may be any unit capable of producing aural advisories. Aural advisories may be discrete sounds, tones, and/or verbal statements used to annunciate a condition, situation, or event. In one embodiment, an aural advisory could call out "VALIDITY CHK FAIL" or "NAV DATA NOT VALID" when a determination of validity is not favorable, "VALIDITY CHK PASS" or "NAV DATA VALID" when a determination of validity is favorable, or "VALIDITY CHK—TBD" or "NAV DATA—TBD" when waiting for the result of a validity determination. As embodied herein, both caution and warning aural advisories could be presented in combination with or simultaneous to visual advisories and/or tactile advisories.

The tactile advisory unit 158 may be any unit capable of producing tactile alerts. Tactile alerts may be any tactile stimulus to present a condition, situation, or event to the pilot. As embodied herein, tactile alerts could be presented in combination with or simultaneous to visual alerts and/or aural alerts.

In an embodiment of FIG. 1, the FMGS 160 may be any system that provides one or more of the following functions: autopilot, flight direction, auto throttle, and/or flight management (e.g., FMS functions). One of the functions that could be performed by the FMGS 160 could include the automated operation of the aircraft during an instrument approach procedure to a runway of intended landing. An unfavorable determination of navigation data validity could result with a disengagement of the FMGS 160 during the approach procedure and/or increase a decision height from where the pilot may be required to make a decision to continue the approach to landing or begin a "missed approach" procedure. The FMGS 160 is known to those skilled in the art.

One of the embodiments presented herein discloses a lateral position monitoring system for use onboard an aircraft during an approach-for-landing phase of flight. A satellite navigation system such as the Global Positioning System ("GPS"), with SBAS augmentation, may provide accurate lateral position, but small undetected satellite errors, terrain masking, or signal in space faults could cause lateral position errors. In addition, fault detection using an SBAS may take several seconds for ground stations to detect even a relatively large fault and relay this information to the aircraft.

This embodiment utilizes data from SBAS-aided satellite navigation system and an inertial system to monitor the satellite navigation system lateral position solution for short-term and long-term faults (or position biases smaller than the GPS alert limit but larger than an alert limit required for the specific flight phase) and produce an alert to the pilot and/or an automated flight control system. In this embodiment, a lateral position estimate may be made by a processor by integrating the inertial velocities from an inertial system and correcting the lateral position estimate of the authority-limited SBAS GPS. The differences between the inertial lateral position and SBAS GPS position may be averaged over time to create an error correction factor for the inertial system for a given duration in time. The weighting and authority limit values may be adjusted during the approach as a function of time and/or height above the runway to ensure an optimal lateral position estimate and error correction estimate. At a given altitude, the inertial lateral position could begin to update using only the lateral error corrections previously derived in real time. This corrected inertial lateral position estimate may be compared with the lateral position from the satellite navigation system to determine if the difference between the reported position of the satellite navigation system and the position estimate produced by the processor 140 agree within an alert limit (i.e., tolerance limit). The alert limit may be adjusted based on time, height above runway, and/or type of approach to ensure that hazardous levels of satellite navigation system errors are detected. If the processor's position estimate and the satellite navigation system's position do not fall within the alert limit, an advisory (e.g., alert) may be presented to the pilot or automated flight control system so that the approach-for-landing may be aborted or modified to ensure safety of flight.

Another one of the embodiments presented herein discloses an altitude monitoring system for use onboard an aircraft during an approach-for-landing phase of flight. Barometric data from an air-data computer system may produce very accurate altitude measurements after correcting for local barometric pressure; however, barometric measurements may tend to have significant time latency. Moreover, the passage of weather fronts, the presence of non-standard temperatures, and other meteorological events could cause offsets in the altitude estimate if they occur between the aircraft and the barometric pressure reference point (such as an airport). The satellite navigation system with SBAS augmentation may provide accurate altitude information, but as stated above, small undetected satellite errors, terrain masking, or signal in space faults may cause errors in the altitude information, and fault detection using an SBAS could take several seconds for the ground stations to detect even a relatively large fault and relay this information to the aircraft.

This embodiment utilizes data from SBAS-aided satellite navigation system, an inertial system, a radar altimeter system, an air-data computer system, and an object database to monitor the satellite navigation system altitude solution for short-term and long-term faults and produce an alert to the pilot and/or an automated flight control system. In this embodiment, an altitude estimate is generated by a processor by integrating barometric-aided vertical speed information from the inertial system and correcting the altitude estimate with an authority-limited weighted sum of barometric altitude and altitude derived from the sum of the terrain elevation from the object database and the height above ground from the radar altimeter. The weighting and authority limit values may be adjusted during the approach as a function of time and/or height above the runway to ensure an optimal altitude estimate. This altitude estimate may be compared with the altitude information from the satellite navigation system to determine if the difference between the satellite navigation system reported altitude, and the altitude estimate produced by the processor agree within an alert limit. The alert limit may be adjusted based on time, height above runway, and/or type of approach to ensure that hazardous levels of satellite navigation system errors are detected. If the processor's altitude estimate and the satellite navigation system's altitude do not agree within the alert limit, an advisory (e.g., alert) may be presented to the pilot or automated flight control system so that the approach-for-landing may be aborted or modified to ensure safety of flight. This embodiment utilizes data from the radar altimeter system and terrain data from an object database, allowing for the system to take advantage of the accuracy of the radar altimeter at low altitudes; however, this heightened level of accuracy may not required for some approach procedures, and terrain data with sufficient resolution, accuracy and fidelity may not be available. In such cases, the method disclosed below may be performed without the benefit of radar altimeter data and/or terrain data.

Figure 2:
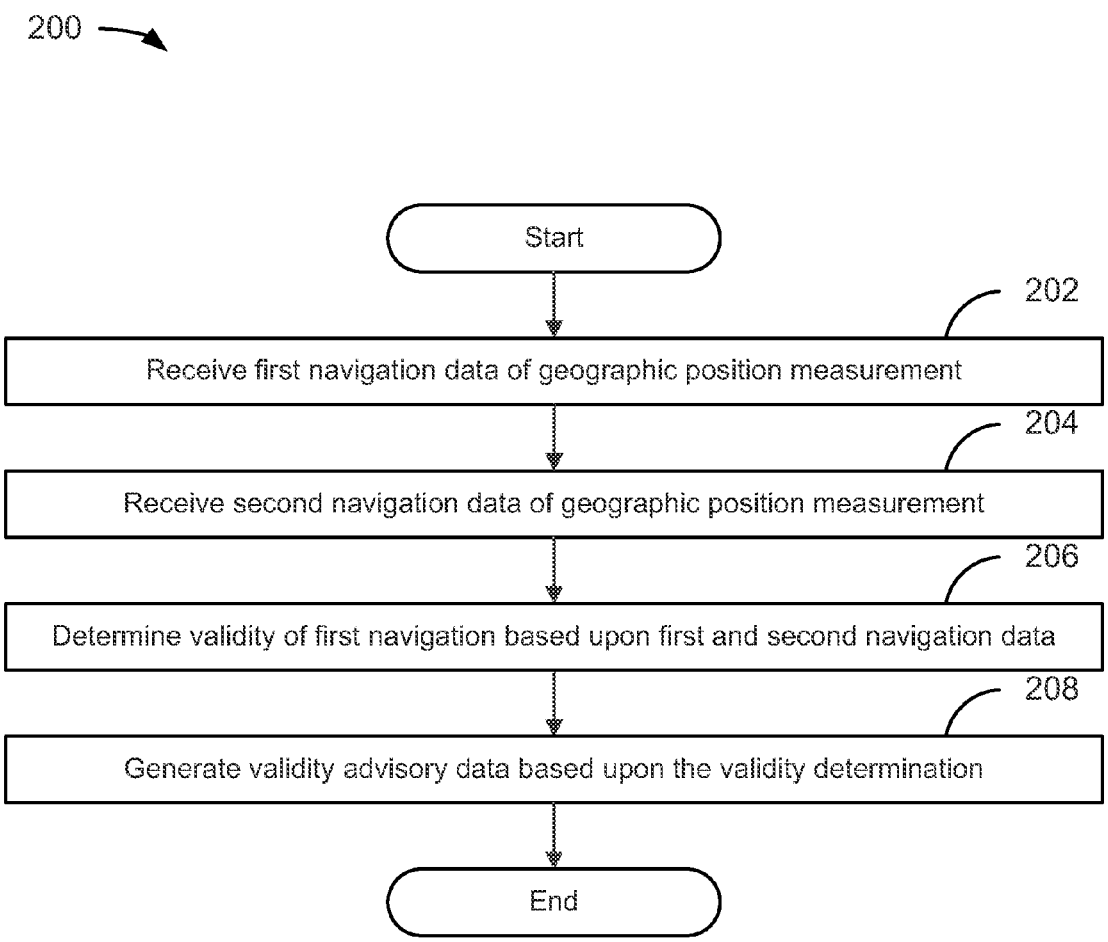
FIG. 2 depicts a flowchart of a method for validating navigation data representative of geographic position.
Figure 4:
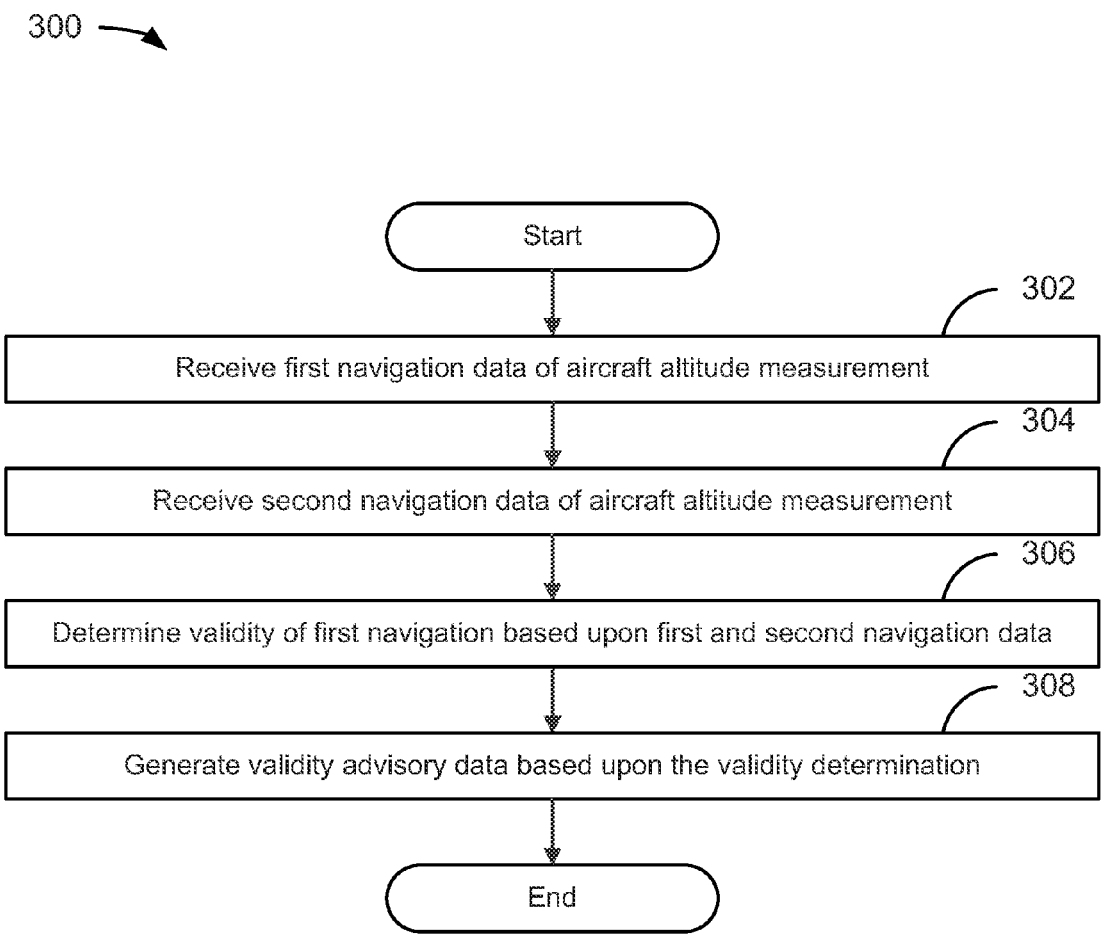
FIG. 4 depicts a flowchart of a method for validating navigation data representative of aircraft altitude.

FIGS. 2 and 4 depict flowcharts 200 and 300, respectively, disclosing examples of methods for validating navigation data, where the processor 140 may be programmed or configured with instructions corresponding to the following modules embodied in flowcharts 200 and 300; although discussed separately, the methods disclosed in flowcharts 200 and 300 may be combined into one method. As embodied herein, the processor 140 may be a processor or a combination of processors found in the navigation data source 110, the object data source 130, and/or the user system 150. Also, the processor 140 may be a processor of a module such as, but not limited to, a printed circuit card having one or more input interfaces to facilitate the two-way data communications of the processor 140, i.e., the receiving and providing of data. As necessary for the accomplishment of the following modules embodied in flowcharts 200 and 300, the receiving of data is synonymous and/or interchangeable with the retrieving of data, and the providing of data is synonymous and/or interchangeable with the making available or supplying of data.

Figure 3:
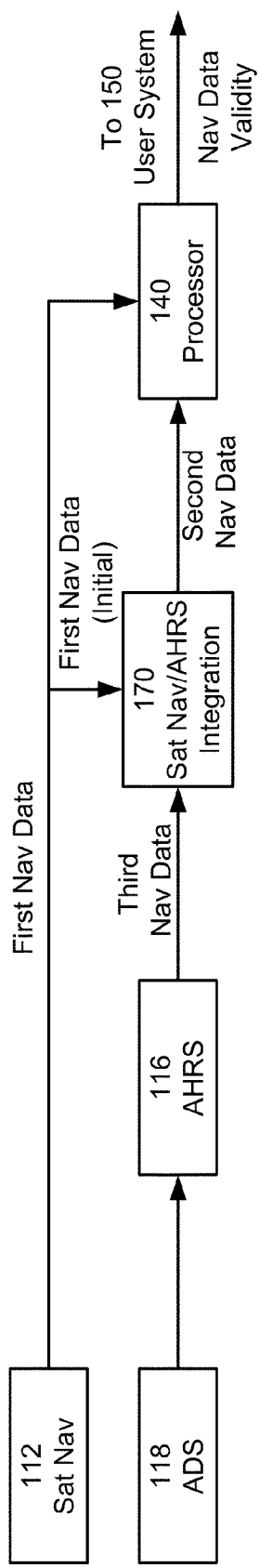
FIG. 3 depicts a data flow diagram of the method shown in FIG. 2.

As shown in FIGS. 2 and 3, the flowchart 200 and a data flow diagram are depicted, respectively. The flowchart begins with module 202 with the receiving of first navigation data by the processor 140, where such first navigation data may be comprised of navigation data provided by an external source (e.g., Sat Nav 112). The first navigation data may be representative of a first measurement of a geographic position.

The flowchart continues with module 204 with the receiving of second navigation data by the processor 140, where such second navigation data may be comprised of integrated navigation data and provided by an integrated data source 170. In one embodiment, this second navigation data may be representative of the second measurement of geographic position (e.g., aircraft geographic position). The second navigation data may be determined as a function of the first navigation data and third navigation data, where such third navigation data may be comprised of navigation data provided by an internal source (e.g., AHSR 116). In one embodiment, this third navigation data may be representative of a third measurement of geographic position. Although not shown, the integrated data source 170 could be the processor 140 configured to determine the second navigation data.

The function for determining the instant measurement of geographic position may be comprised of a first operation and continuous (i.e., real-time) second operations. In the first operation, initial first navigation data may be used by the integrated data source 170 to initialize an instant measurement of geographic position. In the continuous second operations, the third navigation data may be used by the integrated data source 170 to make continuous adjustments to the instant measurement of geographic position; as embodied herein, the instant measurement of geographic position may comprise the second measurement of geographic position represented in the integrated navigation data. In another embodiment, the series of third measurements of geographic position and/or second measurements of geographic position (i.e., instant measurements of geographic position) may be blended through the use of a blending algorithm. The use of blending algorithm(s) (e.g., a Kalman filter) is known to those skilled in the art.

The flowchart continues with module 206 with the determining of a validity of the first navigation data by comparing it with the second navigation data. As embodied herein, the validity of the first navigation data may be determined using a configurable tolerance limit that could be defined by a manufacturer and/or end-user, where valid first navigation data may exist when the difference between the first measurement of geographic position and the second measurement of geographic position falls within the defined tolerance limit. As embodied herein, the defined tolerance limit could be configurable and dependent upon a desired RNP standard corresponding to geographic position.

The flowchart continues with module 208 with the generating of validity advisory data in response to the validity determination, where the validity advisory data may be representative of validity information corresponding to the validity determination; the validity information may be comprised of visual information, aural information, tactile information, or any combination thereof as configured by a manufacturer and/or end-user. In one embodiment, the validity advisory data may be provided to the user system 150 such as, but not limited to, the presentation system 152. If the first navigation data has been determined to be valid, then validity information indicative of the favorable determination may be presented to the pilot on the applicable presentation unit(s); likewise, if the first navigation data has been determined to be not valid, then validity information indicative of the unfavorable determination may be presented to the pilot on the applicable presentation unit(s). Then, flowchart 200 proceeds to the end.

Figure 5:
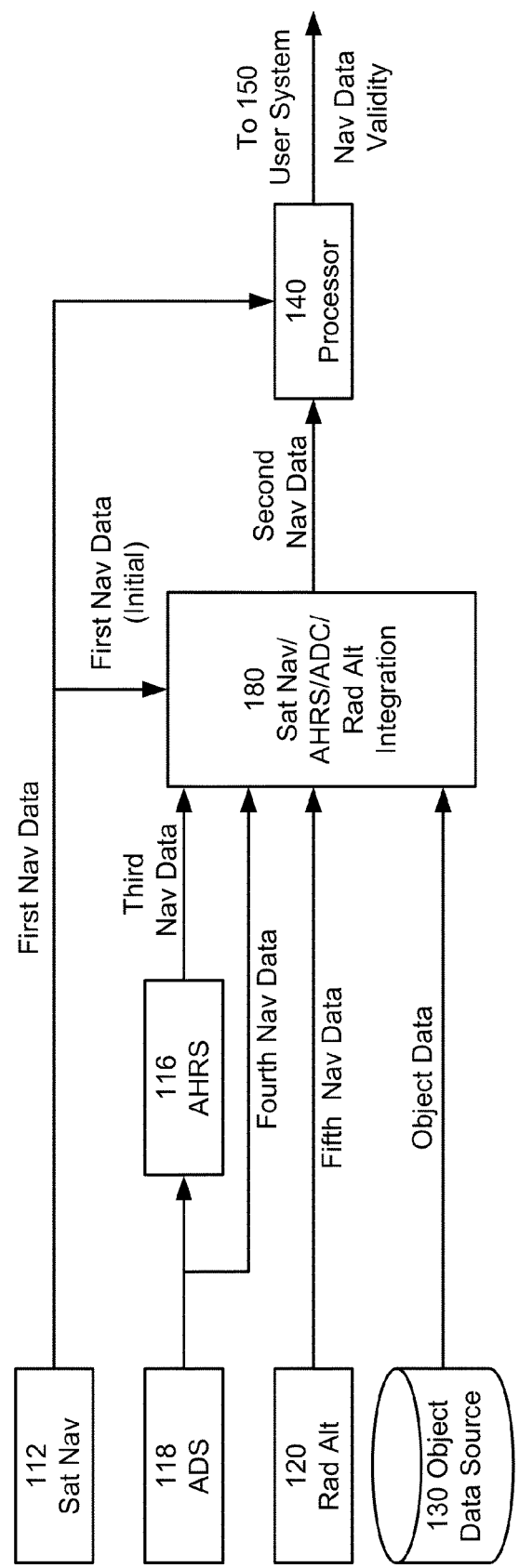
FIG. 5 depicts a data flow diagram of the method shown in FIG. 4.

As shown in FIGS. 4 and 5, the flowchart 300 and a data flow diagram are depicted, respectively. The flowchart begins with module 302 with the receiving of first navigation data by the processor 140, where such first navigation data may be comprised of externally-sourced navigation data provided by an external source (e.g., Sat Nav 112). The first navigation data may be representative of a first measurement of an aircraft altitude.

The flowchart continues with module 304 with the receiving of second navigation data by the processor 140, where such second navigation data may be comprised of integrated navigation data and provided by an integrated data source 180. In one embodiment, this second navigation data may be representative of a second measurement of aircraft altitude. The second navigation data may be determined as a function of the first navigation data, third navigation data, fourth navigation data, fifth navigation data, and object data, where such third navigation data, fourth navigation data, and fifth navigation data may be comprised of internally-sourced navigation data provided by a plurality of internal sources. The third navigation data may be representative of a first measurement of vertical distance provided by a first internal source of navigation data (e.g., AHRS 116), the fourth navigation data may be representative of a third measurement of aircraft altitude provided by a second internal source of aircraft altitude (e.g., ADS 118), and the fifth navigation data may be representative of a second measurement of vertical distance provided by a third internal source (e.g., 120). Although not shown, the integrated data source 180 could be the processor 140 configured to determine the second navigation data.

The function for determining of the instant measurement of aircraft altitude may be comprised of a first operation and continuous (i.e., real-time) second operations. In the first operation, initial first navigation data and initial fourth navigation data may be used by the integrated data source 180 to initialize an instant measurement of aircraft altitude. In the continuous second operations, the third navigation data, fourth navigation data, fifth navigation data, and object data may be used by the integrated data source 180 to make continuous adjustments to the instant measurement of aircraft altitude; as embodied herein, the instant measurement of aircraft altitude may comprise the second measurement of aircraft altitude represented in the integrated navigation data.

When initializing the instant measurement of aircraft altitude, the integrated data source 180 could integrate an initial first measurement of aircraft altitude with an initial third measurement of aircraft altitude by one or more techniques known to those skilled in the art. For example, a statistical analysis could be performed on both initial measurements such as, but not limited to, the determination of an average of the initial measurements or a weighted average of the initial measurements, where the weights being applied to the initial measurements could correspond to measurements of data quality.

When making continuous adjustments to the instant measurement of aircraft altitude, the integrated data source 180 could integrate changes in third measurements of altitude data with changes in first measurements of vertical distance (which could be determined from vertical travel data) and changes in the sums of the second measurements of vertical distance (e.g., aircraft radar altimeter) and the predetermined or stored values of terrain or surface feature elevations represented in the object data by one or more techniques known to those skilled in the art. The resulting integrated measurements of vertical distance may be applied as adjustments to the instant measurement of aircraft altitude. As embodied herein, the series of third measurements of aircraft altitude, first measurements of vertical distance, second measurements of vertical distance, and/or second measurements of aircraft altitude (i.e., instant measurements of aircraft altitude) may be blended through the use of a blending algorithm.

The flowchart continues with module 306 with the determining of a validity of the first navigation data by comparing it with the second navigation data. As embodied herein, the validity of the first navigation data may be determined using a configurable tolerance limit that could be defined by a manufacturer and/or end-user, where valid first navigation data may exist when the difference between the first measurement of aircraft altitude and the second measurement of aircraft altitude falls within the defined tolerance limit. As embodied herein, the defined tolerance limit could be configurable and dependent upon a desired RNP standard corresponding to aircraft altitude or navigation system error defined for a particular phase of flight.

The flowchart continues with module 308 with the generating of validity advisory data in response to the validity determination, where the validity advisory data may be representative of validity information corresponding to the validity determination; the validity information may be comprised of visual information, aural information, tactile information, or any combination thereof as configured by a manufacturer and/or end-user. In one embodiment, the validity advisory data may be provided to the user system 150 such as, but not limited to, the presentation system 152. If the first navigation data has been determined to be valid, then validity information indicative of the favorable determination may be presented to the pilot on the applicable presentation unit(s); likewise, if the first navigation data has been determined to be not valid, then validity information indicative of the unfavorable determination may be presented to the pilot on the applicable presentation unit(s). Then, flowchart 300 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for validating navigation data, such system comprising:
   an externally-sourced navigation system configured to provide first navigation data representative of a first measurement of geographic position; and
   at least one processor configured to
      receive first navigation data from the externally-sourced navigation system,
      determine second navigation data representative of a second measurement of geographic position as a function of sequential operations, where
         a first operation establishes the second measurement of geographic position with first navigation data only, and
         a second operation continuously adjusts the second measurement of geographic position established by the first operation with third navigation data only, where
            the third navigation data is representative of a third measurement of geographic position received from an internally-sourced navigation system, where
               the third navigation data received from the internally-sourced navigation system is derived from inertial sensors and integrated with navigation data derived from pilot-static system sensors, determine a validity of the first navigation data by comparing the first navigation data with the second navigation data, and
generate validity advisory data responsive to the validity determination and representative of validity information.

2. The system of claim 1, wherein
the at least one processor is comprised of a first processor and a second processor, where
the first navigation data is received by both the first processor and the second processor,
the second navigation data is determined by the first processor,
the validity of the first navigation data is determined by the second processor, and
the validity advisory data is generated by the second processor.

3. The system of claim 1, wherein the first navigation data is determined to be valid when the difference between the first measurement of geographic position and the second measurement of geographic position falls within a defined tolerance limit.

4. The system of claim 1, further comprising:
a presentation system configured to
receive the validity advisory data from the at least one processor, where
the at least one processor has been further configured to provide the validity advisory data to the presentation system, and
present the validity information represented in the validity advisory data, whereby
the validity information is presented
visually on the screen of a display unit,
aurally through an aural alert unit,
tactilely through a tactile alert unit, or
any combination thereof.

5. A system for validating navigation data, such system comprising:
an externally-sourced navigation system configured to provide first navigation data representative of a first measurement of aircraft altitude; and
at least one processor configured to
receive first navigation data from the externally-sourced navigation system,
determine second navigation data representative of a second measurement of aircraft altitude as a function of
the first navigation data,
third navigation data representative of a first measurement of vertical distance received from a navigation system in which the third navigation data is derived from inertial sensors,
fourth navigation data representative of a third measurement of aircraft altitude received from a navigation system in which the fourth navigation data is derived from pilot-static system sensors,
fifth navigation data representative of a second measurement of vertical distance received from an aircraft radar altimeter system, and
object data representative of a value of terrain elevation or surface feature elevation received from a source of object data, where
the first measurement of aircraft altitude, the second measurement of aircraft altitude, and the third measurement of aircraft altitude are measurements made with reference to one vertical datum,
determine a validity of the first navigation data by comparing the first navigation data with the second navigation data, and
generate validity advisory data responsive to the validity determination and representative of validity information.

6. The system of claim 5, wherein
the at least one processor is comprised of a first processor and a second processor, where
the first navigation data is received by both the first processor and the second processor,
the second navigation data is determined by the first processor,
the validity of the first navigation data is determined by the second processor, and
the validity advisory data is generated by the second processor.

7. The system of claim 5, wherein
the function causes the at least one processor to perform sequential operations, where
a first operation establishes the second measurement of aircraft altitude as a combination of
initial first navigation data, and
initial fourth navigation data, and
a second operation continuously updates the second measurement of aircraft altitude established by the first operation as a combination of
instant third navigation data,
instant fourth navigation data,
instant fifth navigation data, and
instant object data.

8. The system of claim 5, wherein the first navigation data is determined to be valid when the difference between the first measurement of aircraft altitude and the second measurement of aircraft altitude falls within a defined tolerance limit.

9. The system of claim 5, further comprising:
a presentation system configured to
receive the validity advisory data from the at least one processor, where
the processor has been further configured to provide the validity advisory data to the presentation system, and
present the validity information represented in the validity advisory data, whereby
the validity information is presented
visually on the screen of a display unit,
aurally through an aural alert unit,
tactilely through a tactile alert unit, or
any combination thereof.

10. A method for validating navigation data, such method comprising:
receiving, via at least one processor, first navigation data representative of a first measurement of geographic position from an externally-sourced satellite navigation system;
determining, via the at least one processor, second navigation data representative of a second measurement of geographic position as a function of sequential operations, where
a first operation establishes the second measurement of geographic position with first navigation data only, and
a second operation continuously adjusts the second measurement of geographic position established by the first operation with third navigation data only, where the third navigation data is representative of a third measurement of geographic position received from an internally-sourced navigation system, where
the third navigation data received from the internally-sourced navigation system is derived from inertial sensors and integrated with navigation data derived from pilot-static system sensors;
determining a validity of the first navigation data by comparing the first navigation data with the second navigation data; and
generating validity advisory data responsive to the validity determination and representative of validity information.

11. The system of claim 10, wherein the first navigation data is determined to be valid when the difference between the first measurement of geographic position and the second measurement of geographic position falls within a defined tolerance limit.

12. The method of claim 10, further comprising:
providing the validity advisory data to a presentation system, such that
the validity information represented in the validity advisory data is presented
visually on the screen of a display unit,
aurally through an aural alert unit,
tactilely through a tactile alert unit,
or any combination thereof.

13. A method for validating navigation data, such method comprising:
receiving, via at least one processor, first navigation data representative of a first measurement of aircraft altitude from an externally-sourced navigation system;
determining second navigation data representative of a second measurement of aircraft altitude as a function of
the first navigation data,
third navigation data representative of a first measurement of vertical distance received from a navigation system in which the third navigation data is derived from inertial sensors,
fourth navigation data representative of a third measurement of aircraft altitude received from a navigation system in which the fourth navigation data is derived from pilot-static system sensors,
fifth navigation data representative of a second measurement of vertical distance received from an aircraft radar altimeter system, and
object data representative of a value of terrain elevation or surface feature elevation received from a source of object data, where
the first measurement of aircraft altitude, the second measurement of aircraft altitude, and the third measurement of aircraft altitude are measurements made with reference to one vertical datum;
determining a validity of the first navigation data by comparing the first navigation data with the second navigation data; and
generating validity advisory data responsive to the validity determination and representative of validity information.

14. The method of claim 13, wherein
the function performs sequential operations, where
a first operation establishes the second measurement of aircraft altitude as a combination of
initial first navigation data, and
initial fourth navigation data, and
a second operation continuously updates the second measurement of aircraft altitude established by the first operation as a combination of
instant third navigation data,
instant fourth navigation data,
instant fifth navigation data, and
instant object data.

15. The method of claim 13, wherein the first navigation data is determined to be valid when the difference between the first measurement of aircraft altitude and the second measurement of aircraft altitude falls within a defined tolerance limit.

16. The method of claim 13, further comprising:
providing the validity advisory data to a presentation system, such that
the validity information represented in the validity advisory data is presented
visually on the screen of a display unit,
aurally through an aural alert unit,
tactilely through a tactile alert unit,
or any combination thereof.

* * * * *